United States Patent [19]

Avrahami

[11] Patent Number: 5,117,161
[45] Date of Patent: May 26, 1992

[54] ELECTRONIC BALLAST FOR GAS DISCHARGE LAMPS

[75] Inventor: Zohar Avrahami, Rehovot, Israel

[73] Assignee: Gaash Lighting Industries, Kibbutz Gash, Israel

[21] Appl. No.: 647,088

[22] Filed: Jan. 29, 1991

[30] Foreign Application Priority Data

Feb. 4, 1990 [IL] Israel .......................... 93265

[51] Int. Cl.⁵ .................. H05B 41/24; H05B 41/36
[52] U.S. Cl. ............................ 315/226; 315/149; 315/159; 315/176; 315/209 R; 315/225; 315/DIG. 2; 315/DIG. 5
[58] Field of Search .......... 315/149, 159, 176, 209 R, 315/225, 226, DIG. 2, DIG. 5, DIG. 7

[56] References Cited

U.S. PATENT DOCUMENTS

| | | |
|---|---|---|
| 3,500,455 | 3/1970 | Ross et al. .................... 315/149 |
| 4,538,095 | 8/1985 | Nilssen ........................ 315/225 X |
| 4,734,624 | 3/1988 | Nagase et al. ................ 315/226 X |
| 4,922,154 | 5/1990 | Cacoub ............................ 315/149 |
| 4,949,013 | 8/1990 | Zuchtriegel ............ 315/DIG. 5 X |
| 4,952,842 | 8/1990 | Bolhuis et al. ............. 315/226 X |
| 5,001,400 | 3/1991 | Nilssen ................... 315/DIG. 5 X |

Primary Examiner—David Mis
Attorney, Agent, or Firm—Benjamin J. Barish

[57] ABSTRACT

An improved electronic ballast inverter for a gas discharge lamp includes an oscillator having at least two switching transistors for operating the gas discharge lamp at a high frequency during steady-state operation, a triggering circuit for initiating the operation of the oscillator, and an electrical circuit connected to the oscillator for gradually increasing the base current of at least one of the switching transistors immediately after start-up in order to delay the gas breakdown and thereby to produce preheating of the gas discharge lamp during startup.

8 Claims, 2 Drawing Sheets

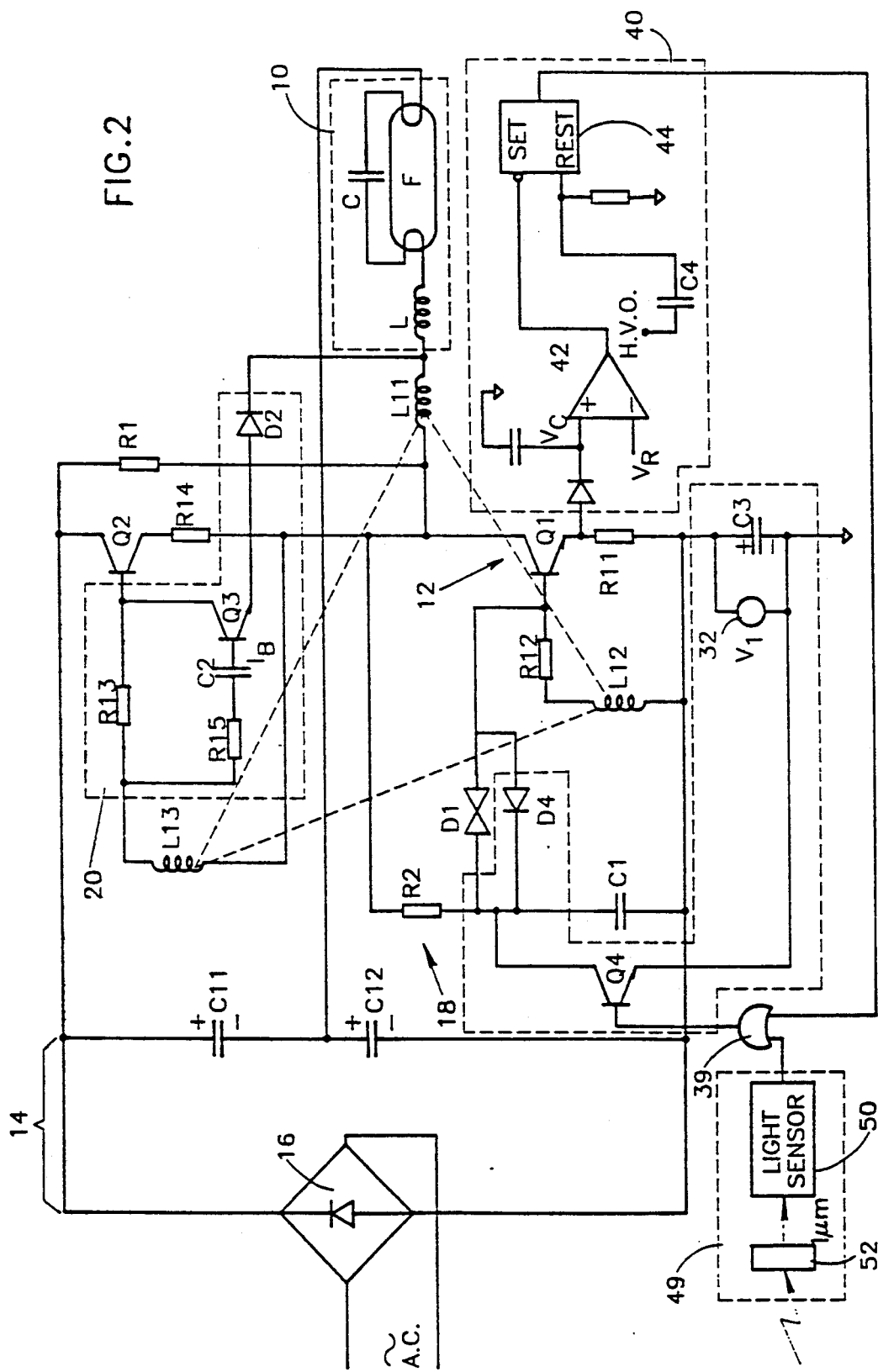

ELECTRONIC BALLAST FOR GAS DISCHARGE LAMPS

FIELD OF THE INVENTION

The present invention relates to electronic ballast oscillators for gas discharge lamps generally.

BACKGROUND OF THE INVENTION

Gas discharge lamps, such as flourescent lamps, are known in the art. It is also known to place an electronic ballast oscillator on the gas discharge lamp to regulate its operation point through regulation of the current flowing through the gas discharge lamp. It is known that, in order not to overstress the filaments of the gas discharge lamp, a preheat time is necessary upon startup. A prior art solution is to place a thermistor at a location where the current through the thermistor roughly equals the current through the load of the gas discharge lamp. The slow thermal time constant of the thermistor will ensure that the voltage received by the electronic ballast oscillator will, upon startup, slowly rise to a high voltage. Filament preheating occurs until the voltage achieves the gas breakdown voltage.

Prior art methods of automatically extinguishing the oscillation of the electronic ballast oscillator utilize an SCR. The SCR can be placed in various locations in the circuit and its purpose is to short the oscillator loop, thereby stopping the oscillations. The SCR is utilized to withstand the high surge currents in the system.

It is known that, as a gas discharge lamp ages, the amount of gas in the lamp decreases, thereby requiring a greater voltage to produce the same amount of light. Overvoltage protection is necessary. In prior art electronic ballast oscillator systems, overvoltage is sensed by sensing the voltage across the lamp and by comparing it to a reference voltage proportional to the input D.C. voltage. If the voltage across the lamp is greater than the reference voltage by more than a predetermined threshold, the lamp is shut off.

SUMMARY OF THE INVENTION

It is an object of the present invention to provide an improved electronic ballast oscillator for gas discharge lamps which overcomes the limitations of prior art solutions to known problems of gas discharge lamps.

According to one aspect of the present invention, there is provided an improved electronic ballast inverter for a gas discharge lamp comprising: oscillator means comprising at least two switching transistors for operating the gas discharge lamp at a high frequency during steady-state operation; triggering means for triggering the operation of the oscillator means; and electrical circuit means attached to the oscillator means for gradually increasing the base current of at least one of the switching transistors immediately after start-up in order to delay the gas breakdown and thereby to produce preheating of the gas discharge lamp during startup.

Additionally, in accordance with an embodiment of the present invention, the electrical circuit means comprises at least on transistor operation in its linear region during startup and in its cutoff region during steady-state operation.

According to another aspect of the invention, there is provided an improved electronic ballast inverter for a gas discharge lamp comprising: oscillator means for operating the gas discharge lamp at a high frequency during steady-state operation; triggering means for triggering the operation of the oscillator means; and low voltage D.C. power supply means for maintaining the voltage at the low end of the oscillator means raised with respect to the ground, the low voltage D.C. power supply means comprising a capacitor which is charged to the low voltage and which is discharged to extinguish the oscillation of the oscillator means.

According to a further aspect of the present invention, there is provided an improved electronic ballast inverter for a gas discharge lamp comprising: oscillator means comprising at least two switching transistors for operating the gas discharge lamp at a high frequency during steady-state operation; triggering means for triggering the operation of the oscillator means; and overvoltage protection means for comparing a voltage proportional to the current through one of the transistors of the oscillator means with a predetermined voltage level and for producing a cutoff signal when the voltage proportional to the current through one of the transistors is above the predetermined level.

BRIEF DESCRIPTION OF THE DRAWINGS

The present invention will be understood and appreciated more fully from the following detailed description taken in conjunction with the drawings in which:

FIG. 2 is an electronic circuit diagram of an improved electronic ballast oscillator circuit for gas discharge lamps constructed and operative in accordance with a preferred embodiment of the present invention.

Figure 1:
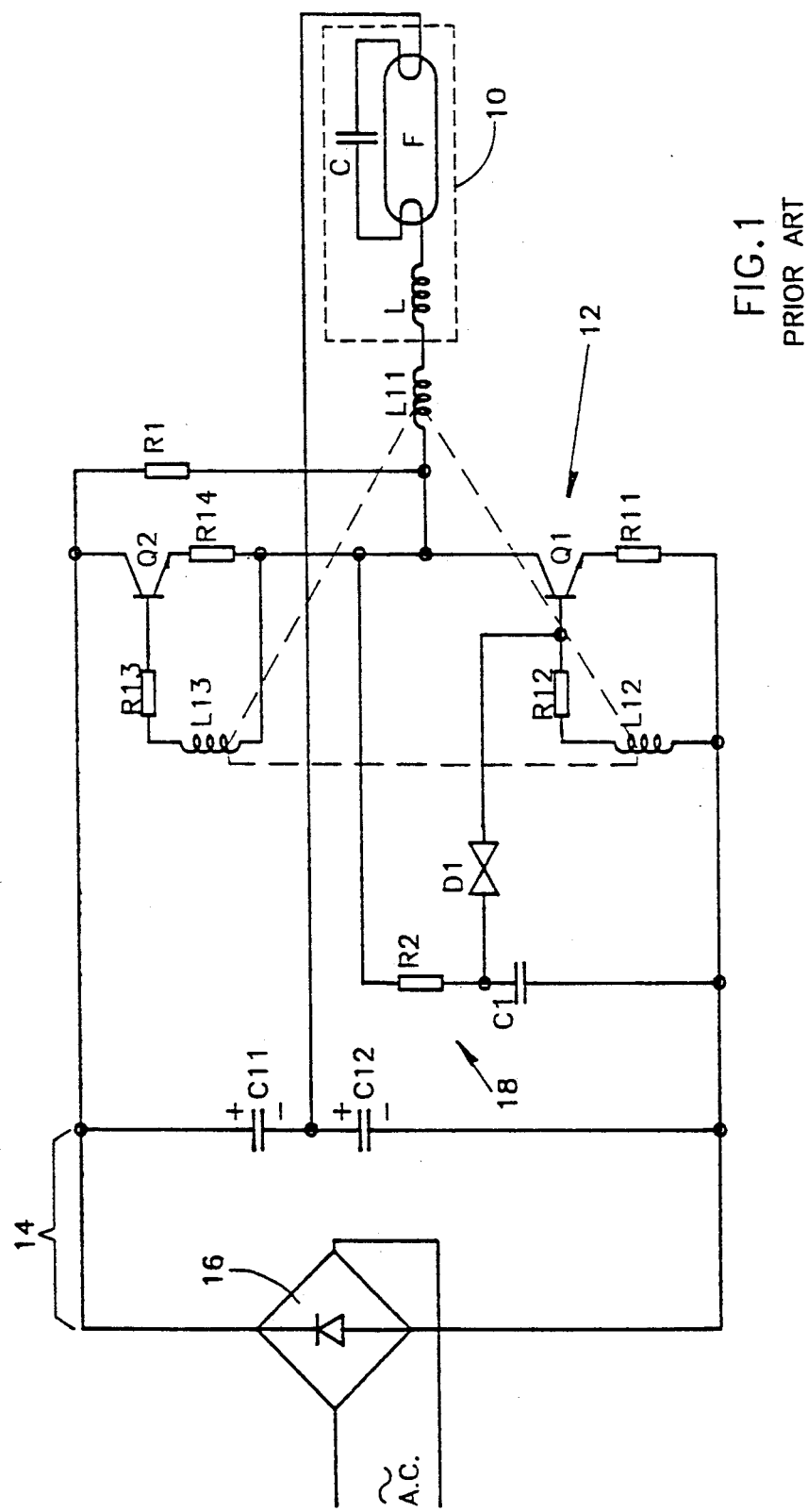
FIG. 1 is an electronic circuit diagram of a prior art basic oscillator circuit for gas discharge lamps.

DETAILED DESCRIPTION OF PRESENT INVENTION reference is now made to FIG. 1 which illustrates an electronic ballast oscillator, as is known in the prior art, for gas discharge lamps. A gas discharge lamp 10, such as a flourescent lamp, typically comprises filaments F, a capacitor C and an inductor L.

The electronic ballast oscillator typically comprises an oscillator 12 for operating a load, such as the gas discharge lamp 10, at a high frequency typically in the range of 25-40 Khz, two transistors Q1 and Q2, three inductors L11, L12 and L13 connected together as a saturated transformer L11-L12-L13, and various resistors R11, R12, R13 and R14 as necessary. An A.C. current to D.C. current converter 14, comprising a diode 16 and two Capacitors C11 and C12, produces D.C. voltage for operating the gas discharge lamp 10 and a saw tooth trigger 18 operating at low frequency initiates the operation of the free running oscillator 12. The saw tooth oscillator 18 comprises capacitor C1, resistors R1 and R2, and a diac D1.

As is known in the art, voltage oscillates between the circuit around Q1, comprising R11, R12 and L12, and the circuit around Q2, comprising R13, R14 and L13. The saturated transformer L11-L12-L13 provides the feedback path to maintain the oscillations.

The inductor L serves as a ballast component to regulate the lamp operation point. Since the operating frequency of the lamp is high, only a small inductance is necssary to attain the ballast function.

Before the gas discharge, the lamp 10 exhibits a high impedance, practically approaching infinity, thereby the oscillator load consists of a series resonant circuit made of inductor L, capacitor C and the resistance of the filaments F. This resonant circuit pulls the oscillator to the resonant frequency, since the voltage across the capacitor $$\frac{1}{C_{1S}}$$

equal to the voltage across the lamp. The capacitor voltage provides the required voltage to initiate the discharge of the gas and is determined by the quality factor Q of the resonant circuit and by the driving voltage.

Reference is now made to FIG. 2 which illustrates a preferred embodiment of the present invention. As in the prior art, it is desired that the voltage applied to the gas discharge lamp 10 slowly rise upon initiation of operation. In accordance with a preferred embodiment of the present invention, this is effected through the addition of a circuit 20, comprising a transistor Q3, connected to the feedback circuit of the oscillator 12.

When voltage is induced across inductor L13 for the first time in the operation of the free running oscillator 12, charge begins to accumulate on a capacitor C2 of circuit 20. However, capacitor C2 typically does not reach its fully charged state. While capacitor C2 is charging, it is capable of passing a current $I_B$ to the base of transistor Q3. The base current $I_B$ is low enough to ensure that transistor Q3 operates in its linear region. Therefore, the transistor collector current, $I_C$, is a multiple of the base current $I_B$. As can be seen from FIG. 2, the collector current $I_C$ reduces the amount of base current available to the transistor Q2. Transistor Q2 thus switches on slowly thereby reducing the oscillation frequency of oscillator 12 and departing from the resonant frequency of the LC resonator. Accordingly, a lower predischarge voltage is developed across capacitor C thereby preventing the instantaneous discharge of the lamp 10. However, current does flow through the filaments F during the predischarge interval which causes the lamp 10 to preheat.

It will be appreciated that a diode D2 prevents discharge of capacitor C2 during the negative phase of the oscillation.

When the oscillation returns to the feedback loop of Q2, charge is again allowed to accumulate on capacitor C2. The base current $I_B$ is less than its previous value and therefore, the collector current $I_C$ is less. Accordingly, the voltage across Q2 is greater. This process continues, typically over a multiplicity of oscillations, until capacitor C2 is completely charged and the base current $I_B$ is zeroed. Once capacitor C2 is completely charged, the base current of transistor Q2 is large enough to cause Q2 to operate in its saturated region, enabling oscillator 12 to operate at the resonant frequency of the LC circuit of the gas discharge lamp 10. This results in the development of a high voltage across gas discharge lamp 10, enabling the lamp 10 to turn on after having been preheated during the charging of capacitor C2.

It will be appreciated that the amount of charge accumulated on capacitor C2 depends on and effects the frequency of the oscillations. The initial oscillations are at low frequencies and the voltages produced are generally low.

The forward voltage drop across D2 can reduce the reduction of the base current available to transistor Q2 which can hasten the preheating of the lamp 10. To overcome this effect, diode D2 is connected between the transistor Q3 and the inductor L11 thereby providing a higher voltage to transistor Q3.

It is a feature of the present invention that, in the steady state operation of the electronic ballast oscillator, fully charged capacitor C2 causes diode D2 to be cutoff, thereby virtually disconnecting circuit 20 from the oscillator circuit. Thus, circuit 20 typically dissipates little or no power, thereby optimizing the efficiency of the electronic ballast. In the prior art, a thermistor to be self-heated is incorporated at a location where the current through the thermistor is roughly equivalent to the current through the load. In steady state, the resistance of the thermistor remains at a high enough level to dissipate constant power, thereby reducing the efficiency of the prior art device.

Further, circuit 20 is built of inexpensive components and generally costs less than the thermistor solution of the prior art.

In order to automatically extinguish the operation of the free running oscillator 12, an extinguising circuit 30 is typically included. In accordance with a preferred embodiment of the present invention, circuit 30 comprises a D.C. voltage supply 32 of voltage level $V_1$, typically 10V, for raising the common voltage level of the oscillator, and a capacitor C3 charged to $V_1$ for supplying, upon activation, a surge charge required to extinguish the oscillations of oscillator 12. That is, capacitor C3 is charged to the low voltage $V_1$, and is discharged to extinguish the oscillations of the oscillator 12.

Circuit 30 additionally comprises a diode D4 and a transistor Q4 for providing a discharge path for the surge charge of capacitor C3. When a cutoff signal is sent to transistor Q4 from one of two cutoff circuits described in more detail hereinbelow, transistor Q4 becomes saturated, thereby enabling the discharge path. The discharge cuts off transistor Q1 and thus, stops the feedback loop of the oscillator 12 In addition, transistor Q4 prevents capacitor C1 from charging. This disables the sawtooth trigger 18 thereby preventing any attempt to restart oscillator 12 until the cutoff signal is removed.

One of the cutoff signals is supplied to the transistor Q4, via an OR network 39, from a overvoltage protection circuit 40. Prior art overvoltage protection circuits compare the voltage of the gas discharge lamp 10 with a reference voltage proportional to the input D.C. voltage, extinguishing the operation of the oscillator if the gas discharge lamp voltage is a percentage above the reference voltage. This method is subject to malfunctioning since, during startup, the lamp voltage and the reference voltage build up at different rates. Thus, it is difficult for a circuit designer to adjust the allowed percentage difference accurately. The allowed percentage difference has to be low enough to protect for overvoltages during steady-state operation, but high enough not to falsely cutoff the oscillations of the oscillator 12 during turn-on transients.

The present invention measures a voltage $V_e$, across resistor R11, which is proportional to the current flowing through the gas discharge lamp 10. Circuit 40 integrates and senses $V_e$, via an integrating circuit 41, and compares it to a constant reference voltage $V_R$. If $V_e$ is greater than $V_R$, as measured by comparator 42, then a flip-flop 44 is set and a cutoff signal is sent, via OR network 39, to transistor Q4.

It will be appreciated that, since $V_R$ is a constant reference voltage, when the current through the load network comprising inductor L, capacitor C and lamp 10 exceeds a predetermined level, the operation of the electronic ballast oscillator is extinguished.

When the source causing the overvoltage is removed and the circuit is turned on, a reset signal to the flip-flop 44 is sent by passing a high voltage through capacitor C4.

It will be appreciated that voltage $V_e$ gives a good indication of the operation of the electronic ballast oscillator. If the gas discharge lamp 10 weakens, the electronic ballast oscillator will fail to start the lamp 10. The filaments F act as a short circuit, causing the load on the oscillator 12 to be only the series resonant circuit of inductor L and capacitor C. Since the circuit of inductor L and capacitor C has a small impedance at or near the resonant frequency, higher currents will develop as a result throughout the electronic ballast oscillator, and in particular, through resistor R11. It is a feature of the present invention that by measuring currents rather than voltages, generally no spurious cutoffs will occur during startup since currents generally remain low during startup of the oscillator 12. This is due to the fact that the startup input D.C. voltage is a slowly rising voltage.

It is a feature of the present invention that a second cutoff signal is supplied from an automatic on/off circuit 49 incorporated into the electronic ballast. The automatic on/off circuit 49 automatically turns off the gas discharge lamp 10 when sunlight is available and turns it on when there is no sunlight. The on/off circuit 49 typically comprises a light sensor 50, such as a phototransistor TIL 78 manufactured by Texas Instruments. Typically connected with the light sensor 50 is a window filter 52 for distinguishing between lamp light and sunlight.

Since, in the range of 1 μm wavelength light, fluorescent light is weak and sunlight is strong, window filter 52 is designed to pass only the long wavelength components of sunlight (i.e. the 1 μm wavelength light) to light sensor 50.

The light sensor 50 produces a positive signal when the light sensed exceeds a predetermined light level. The output of the light sensor 50, being a response to sunlight, is sent to OR network 39. It will be appreciated that OR network 39 sends a cutoff signal to transistor Q4 upon receipt of a positive signal from either the light sensor 50 or the overvoltage protection circuitry 40.

It will be appreciated by persons skilled in the art that the present invention is not limited to what has been particularly shown and described hereinabove. Rather the scope of the present invention is defined only by the claims which follow.

I claim:

1. An improved electronic ballast inverter for a gas discharge lamp comprising:
   oscillator means comprising at least two switching transistors for operating the gas discharge lamp at a high frequency during steady-state operation;
   triggering means for triggering the operation of said oscillator means; and
   electrical circuit means attached to said oscillator means for gradually increasing the base current of at least one of said switching transistors immediately after start-up in order to delay the gas breakdown and thereby to produce preheating of said gas discharge lamp during startup.

2. An improved electronic ballast inverter according to claim 1 and wherein said electrical circuit means comprise at least one transistor operating in its linear region during startup and in its cutoff region during steady-state operation.

3. An improved electronic ballast inverter for a gas discharge lamp comprising:
   oscillator means for operating the gas discharge lamp at a high frequency during steady-state operation;
   triggering means for triggering the operation of said oscillator means; and
   low voltage D.C. power supply means for maintaining the voltage at the low end of the oscillator means raised with respect to the ground, said low voltage D.C. power supply means comprising a capacitor which is charged to said low voltage and which is discharged to extinguish the oscillation of said oscillator means.

4. An improved electronic ballast inverter for a gas discharge lamp comprising:
   oscillator means comprising at least two switching transistors for operating the gas discharge lamp at a high frequency during steady-state operation;
   triggering means for triggering the operation of said oscillator means; and
   overvoltage protection means for comparing a voltage proportional to the current through one of said transistors of said oscillator means with a predetermined voltage level and for producing a cutoff signal when said voltage proportional to the current through one of said transistors is above said predetermined level.

5. An improved electronic ballast inverter according to claim 4 and also comprising a cutoff transistor for receiving said cutoff signal.

6. An improved ballast inverter according to claim 5 wherein said cutoff transistor is coupled to low voltage D.C. power supply means comprising a capacitor which is charged to said low voltage and which is discharged to extinguish the oscillation of said oscillator means.

7. An improved electronic ballast inverter according to claim 4 further including:
   photocell control means for extinguishing the oscillation of said oscillator means in response to the presence of sunlight.

8. An improved electronic ballast inverter according to claim 7 and including spectral filter window means attached to said photocell control means for sensing long wavelength radiation thereby to distinguish between lamp light and sunlight.

* * * * *